Aug. 7, 1928.  T. RUSSELL  1,680,067
PROCESS FOR MAKING SHEET METAL CHAINS
Filed June 24, 1927
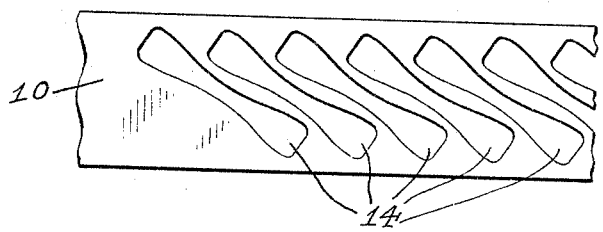
 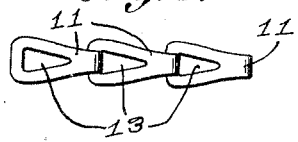
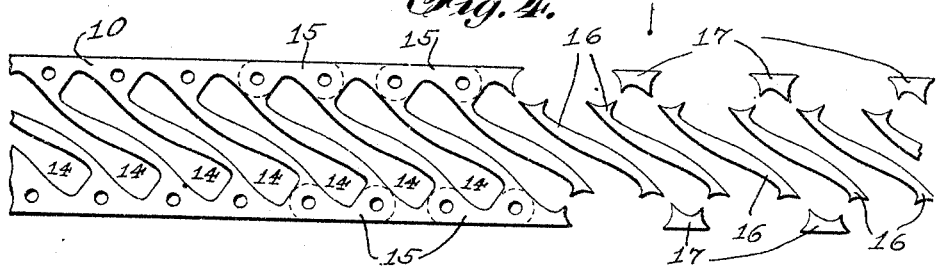
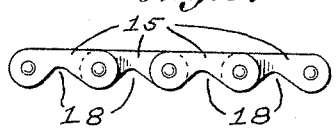 
INVENTOR
Theodore Russell
BY
H. G. Manning
ATTORNEY Patented Aug. 7, 1928.

1,680,067

UNITED STATES PATENT OFFICE.

THEODORE RUSSELL, OF NAUGATUCK, CONNECTICUT, ASSIGNOR TO J. M. RUSSELL MANUFACTURING COMPANY, OF NAUGATUCK, CONNECTICUT, A CORPORATION OF CONNECTICUT.

PROCESS FOR MAKING SHEET-METAL CHAINS.

Application filed June 24, 1927. Serial No. 201,131.

This invention relates to sheet metal chains, and more particularly to a process of making chain links from a sheet metal strip by stamping said links diagonally with respect to the length of the strip.

One object of the invention is to produce from a single strip of sheet metal a plurality of links which are stamped diagonally from the interior of said strip and a plurality of other links which are stamped longitudinally from the edge thereof.

A further object is to produce sheet metal links for chains which will be simple in construction, inexpensive to manufacture, ornamental in appearance, and very efficient and durable in use.

Fig. 1 represents a plan view of a portion of a sheet metal blank from which a plurality of diagonally arranged chain links have been stamped out.

Fig. 2 is a plan view of one of the links stamped out from the blank shown in Fig. 1, as it appears when eye slots have been cut in the ends thereof.

Fig. 3 is a top view of a portion of the chain formed from said links.

Fig. 4 is a plan view of the scrap remaining after the diagonal links have been stamped out, showing at the left in dotted lines the shape of the longitudinal links to be stamped therefrom, and showing at the right the scrap remaining after said longitudinal links have been removed.

Fig. 5 is a side view of a silent link chain made from the longitudinal links.

Fig. 6 is a top view of the silent link chain.

In the manufacture of sheet metal links in the past it has been found that the wider the strip from which the links were stamped the lower would be the cost thereof. In order to take advantage of such wide strips, the links were either stamped out in parallel longitudinal rows or were stamped transversely to the length of the strip.

Chain links made by the first of these methods were quite expensive due to the multiplication of tools required, while the chain links made by the second method were quite weak on account of the fact that the transverse strength of the metal of the strip is lower than the longitudinal strength along the strip in the direction of the grain.

By means of the present invention, the above and other disadvantages have been avoided and a chain link has been produced which combines to a considerable degree the longitudinal strength along the grain of the strip, and the advantage of using a relatively wide blanking strip. This has been accomplished by stamping the links diagonally from the metal strip using only a single blanking punch. After the diagonally stamped links have been removed from the blank, a second set of short links may be obtained by utilizing the longitudinal side edges of said blank, said longitudinal side links being suitable for use in silent chains or for other purposes.

Referring now to the drawings in which like reference numerals denote corresponding parts throughout the several views, the numeral 10 indicates a sheet metal blank or strip from which the two forms of chain links are to be stamped. The first step of the process of making said links is to stamp out as by a blanking punch a series of links 11 having eyes 12 and 13 in their opposite ends leaving apertures 14 in said strip 10. The blanking punch should preferably be arranged at an angle of about 37 degrees with respect to the centre line of the strip 10, although this particular angle is not essential.

The shape of the strip of scrap remaining after the diagonally stamped links 11 have been removed from the strip 10 is clearly shown at the left of Fig. 4. This strip of scrap is then sent through the same or another machine in which links 15 are stamped out longitudinally from the edges of said strip of scrap, as indicated by dotted lines in Fig. 4. After this operation, there will remain only the elongated central scrap pieces 16 and the side scrap pieces 17, constituting a very small percent of the original metal, as shown at the right in Fig. 4.

Each of the edge links 15 is straight on one side and has a recess 18 on its other side, as clearly shown in Fig. 4. As will be clear from the drawing, these links 15 take their shape from the outline of the outer corners of the apertures 14 left in the scrap after the diagonally stamped links 11 have been removed. The links 11 are adapted to be made up into light-duty sash chains and the like, whereas the links 15 may be made up into a silent link chain, such as shown in Figs. 5 and 6, for use in damper regulators, pull chains, balance chains, drill presses, etc.

In the silent link chain, the links 15 are connected, as shown, by pins 19. The links 15 are also adapted for use in making up angle pieces for reinforcing box edges. Moreover, it is also within the scope of the invention to form the edges of the strip of scrap into saw blades.

One advantage of the present invention is the utilization in a single chain of the economy resulting from the use of relatively wide metal strips and the strength resulting from cutting the links along the grain of the metal.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. The process of making blanks for the manufacture of looped chain links which comprises successively stamping said blanks from an elongated relatively wide flat metal strip diagonally to the longitudinal grain thereof and parallel to each other, said blanks being cut at an angle of substantially 40 degrees to the length of said strip, whereby said links will have greater strength than links cut at right angles to the length of a wider strip of equal temper and may be made at less expense than links cut along the grain from a narrower strip of equal temper.

2. The process of making two different forms of links from a single sheet metal strip, which comprises successively stamping out a plurality of links diagonally to the grain of said strip, and then successively stamping a plurality of links longitudinally from both edges of the scrap left after said diagonally stamped links have been removed, said second-mentioned links having central recesses of the same outline as the corners of said first-mentioned links.

In testimony whereof, I have affixed my signature to this specification.

THEODORE RUSSELL.